United States Patent
Dhong et al.

(10) Patent No.: US 8,131,795 B2
(45) Date of Patent: *Mar. 6, 2012

(54) HIGH SPEED ADDER DESIGN FOR A MULTIPLY-ADD BASED FLOATING POINT UNIT

(75) Inventors: Sang Hoo Dhong, Austin, TX (US); Silvia Melitta Mueller, St. Ingbert (DE); Hwa-Joon Oh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 635 days.

This patent is subject to a terminal disclaimer.

(21) Appl. No.: 12/323,257

(22) Filed: Nov. 25, 2008

(65) Prior Publication Data

US 2009/0077155 A1    Mar. 19, 2009

Related U.S. Application Data

(63) Continuation of application No. 10/733,839, filed on Dec. 11, 2003, now Pat. No. 7,490,119.

(51) Int. Cl.
*G06F 7/42* (2006.01)
*G06F 7/38* (2006.01)
(52) U.S. Cl. .................................. 708/505; 708/501
(58) Field of Classification Search ............. 708/505, 708/501
See application file for complete search history.

(56) References Cited

U.S. PATENT DOCUMENTS

| 5,790,445 A | 8/1998 | Eisen |
| 5,892,698 A | 4/1999 | Naffziger |
| 5,928,316 A | 7/1999 | Wong et al. |
| 6,542,915 B1 | 4/2003 | Dibrino et al. |
| 7,137,021 B2 | 11/2006 | Dhong |

OTHER PUBLICATIONS

Goldberg, David; "What Every Computer Scientist Should Know About Floating-Point Arithmetic"; Computing Surveys, Mar. 1991; Association for Computing Machinery, Inc.
Ferguson, M. I. et al; "A Multiplier with Redundant Operands"; 33$^{rd}$ Annual Conference on Signals, Systems, and Computers; Asilomar, Pacific Grove, California; Oct. 1999.

*Primary Examiner* — Tan V Mai
(74) *Attorney, Agent, or Firm* — James L. Baudino; Matthew B. Talpis

(57) ABSTRACT

A method is provided for improving a high-speed adder for Floating-Point Units (FPU) in a given computer system. The improved adder utilizes a compound incrementer, a compound adder, a carry network, an adder control/selector, and series of multiplexers (muxes). The carry network performs the end-around-carry function simultaneously to and independent of other required functions optimizing the functioning of the adder. Also, the use of a minimum number of muxes is also utilized to reduce mux delays.

11 Claims, 2 Drawing Sheets

HIGH SPEED ADDER DESIGN FOR A MULTIPLY-ADD BASED FLOATING POINT UNIT

CROSS-REFERENCE TO RELATED APPLICATIONS

This application is a continuation of, and claims the benefit of the filing date of, U.S. patent application Ser. No. 10/733,839 entitled HIGH SPEED ADDER DESIGN FOR A MULTIPLY-ADD BASED FLOATING POINT UNIT filed Dec. 11, 2003 now U.S. Pat. No. 7,490,119.

BACKGROUND OF THE INVENTION

1. Technical Field

The present invention relates generally to a high-speed floating-point adder (adder) and, more particularly, to the improvement of some of the most time critical elements that exist in the adder, such as the end-around-carry-logic.

2. Description of the Related Art

Floating-Point Units (FPU) are well known, and have been an element of computer architecture for a number of years. However, such calculations, while useful, are intensive and require extensive computing power. Generally, a floating-point number consists of three components: a sign bit, exponent, and mantissa. Addition, subtraction, multiplication, and division operations occur through the manipulation of bits via the use of the bits and the bits' 1's and 2's complements. Here, the concern is more with the use of the End-Around-Carry Principle specifically regarding the operations of multiply-add and multiply-subtract.

A method, well-known in the art, is utilized to perform the multiply-add and multiply-subtract operations in a base 2 system. The addend is aligned so as to properly orient the digits of the fraction of product and addend to their corresponding order of magnitude or properly orient the bits to their corresponding weights. The process of alignment, thus, converts the fraction of the addend into a number that is $4n+2$ bits long, where n bits are the addend and the remaining $3n+2$ bits are 0. During the process of alignment, the addend is further subdivided into three constituent vectors, which correspond as follows: A corresponds to most significant n bits, B corresponds to the middle $2n+2$ bits, and C corresponds to the least significant n bits. The variable for a floating point calculation are as follows: COUT is the carry-out bit, P is the product, A represents the most significant n bits of the addend, B represents the middle $2n+2$ bits, and C represents the least significant n bits, which are compressed into sticky bit (sticky). The calculation is as follows:

$$\text{Addend } D = (A*2^{(2n+2)} + B + 0.5*\text{sticky}) \quad (1)$$

$$\text{Let sum0} + (2^{(2n+2)})\text{COUT} = B+P \quad (2)$$

$$\text{Let } A' = A + \text{COUT} \quad (3)$$

For an effective addition (for example, a multiply-add where product and addend have like signs, or a multiply-subtract where product and addend have different signs)

$$R = P+D = (2^{(2n+2)})A' + \text{sum0} + 0.5\text{sticky} \quad (4)$$

For an effective subtraction $$R = \text{abs}(P-D) \quad (5)$$

$$\text{Let sum0}' + 2^{(2n+2)}*\text{cout}' = (!B+P) \quad (6)$$

$$\text{Let } A' = (!A + \text{cout}') \text{ modulo } 2^n \quad (7)$$

If in Equation 5, the product is larger than the addend, for example, P>D, then $$R = P-D = (2^{(2n+2)})A'' + \text{sum0}' + !\text{sticky}*0.5 + 0.5 \quad (8)$$

If in Equation 5, the product is smaller than the addend, for example, P<D, then $$R = -(P-D) = !A''*2^{(2n+2)} + !\text{sum0}'' + \text{sticky}*0.5 \quad (9)$$

The end-around carry does not immediately follow from the above calculations. However, the above calculations illustrate the end-around-carry principle process. For computing abs(P−D), one computes R=P+!D and adds the carry-out to the result as carry-in R'=R+0.5*cout. Also, depending on the carry-out, R' can be negated. The selection between the use of Equation 8 and Equation 9 is dependent on the value of the carry out bit (COUT) of Equation 6. If COUT=1, then Equation 8 applies. However, for COUT=0, Equation 9 applies. In other words, the calculation for the operation of subtraction hinges on the greater of the two terms. This calculation, though, can be cumbersome and difficult.

Therefore, there is a need for a method and/or apparatus to streamline each of the processes that make both evaluations and calculations that address at least some of the problems associated with conventional methods and apparatuses for floating point computations.

SUMMARY OF THE INVENTION

The present invention provides an apparatus for computing floating-point operations wherein the apparatus receives an aligned addend comprising a plurality of bits and receives a plurality of products. Also, compound incrementer is provided, wherein the compound incrementer receives at least some of the plurality of bits of the aligned addend. Also, a compression counter is provided, wherein the compression counter receives at least some of the plurality of bits of the aligned addend and the products. Also, a compound adder is provided that receives the output of the compression counter. Also, a carry network is provided, wherein the carry network simultaneously computes an end-around-carry with at least some other computational operations and wherein the carry network receives the products and receives the output of the compression counter. Also, a selector is provided, wherein the selector at least receives the output of at least some of the plurality of bits of the addend and wherein the selector at least receives the output of the carry network. Also, a plurality of multiplexers (muxes) is provided, wherein the plurality of muxes receive outputs from the compound incrementer, the compound adder, and the selector.

BRIEF DESCRIPTION OF THE DRAWINGS

For a more complete understanding of the present invention, and its advantages, references will now be made in the following Detailed Description to the accompanying drawings, in which.

DETAILED DESCRIPTION OF THE INVENTION

In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail.

Figure 1:
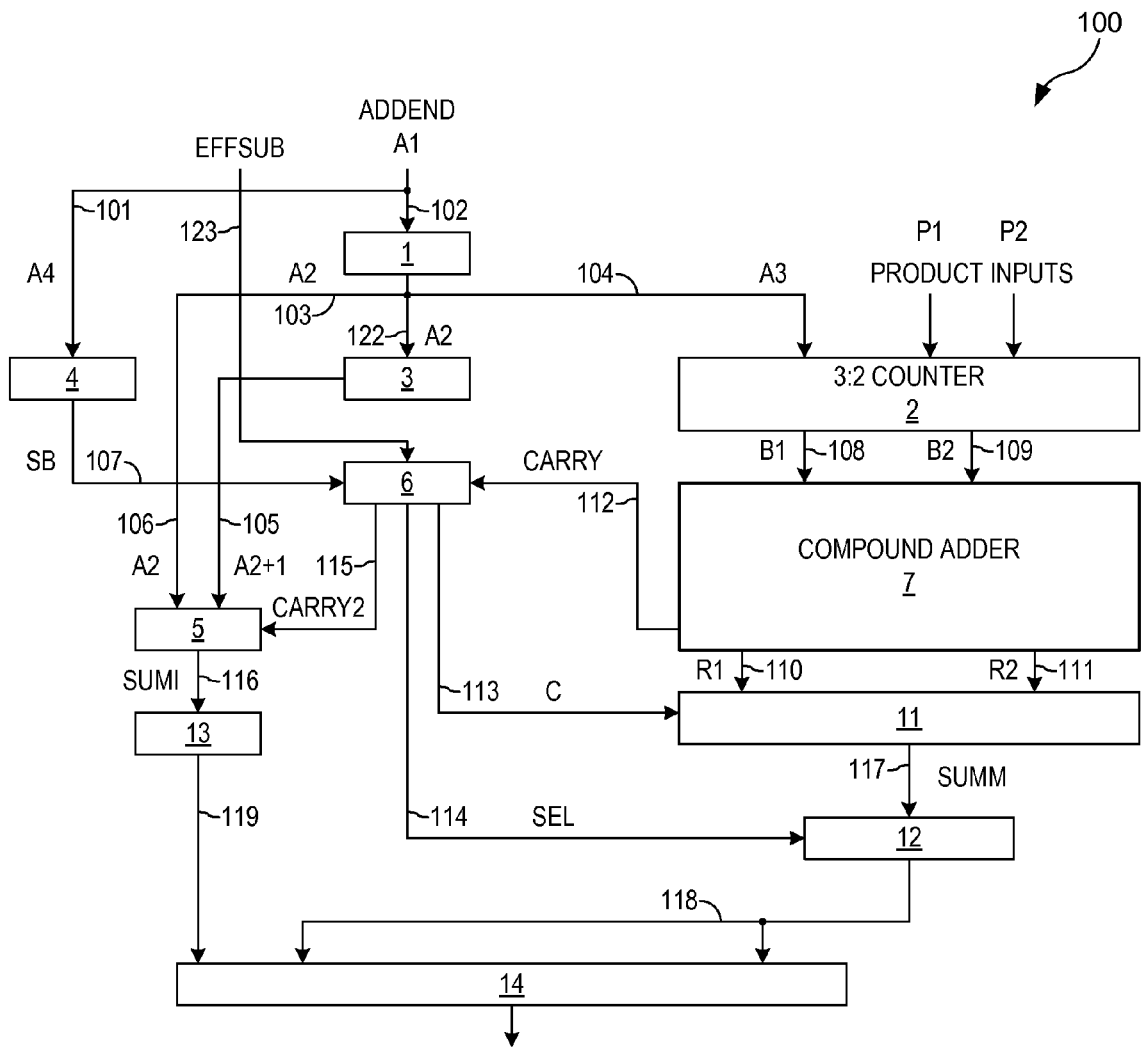
FIG. 1 is a block diagram of a Prior Art High Speed Adder.

Referring to FIG. 1 of the drawings, the reference numeral 100 generally designates a conventional high speed floating point adder.

FIG. 1 is an illustration of a conventional high speed floating point adder 100. Three inputs are inputted into the high speed floating point adder 100, which correspond as follows: A1 is the addend, the product is given in a redundant form as the sum of a first product vector P1 and a second product vector P2. The product is of a length 2n bits where n corresponds to the precision of the floating point. For example, if single precision is employed then n=24, and if double precision is employed, then n=53.

The addend A1 is aligned so as to properly orient the digits of the fractions of the product P1 and P2 and addend A1 to their corresponding order of magnitude, or to properly orient the bits to their corresponding weights. The process of alignment, thus, converts the fraction of the addend A1 into a number that is 4n+2 bits long, where n bits are the original addend A1 fraction and the remaining 3n+2 bits are 0. During the process of alignment, the addend A1 is further subdivided into three constituent vectors, which correspond as follows: A2 corresponds to most significant n bits, A3 corresponds to the middle 2n+2 bits, and A4 corresponds to the least significant n bits.

Once alignment has occurred, the numbers are inputted into the high speed floating point adder 100. The least significant bit vector A4 is inputted into the sticky bit computation component 4 through a first communication channel 101. The middle bit vector A3 and the most significant bit vector A2 are inputted into the negation element 1 through a second communication channel 102, which based on the operation signal EFFSUB negates the vectors or passes them through unchanged. If EFFSUB=1, EFFSUB indicates an effective subtraction in which case the addend has to be negated. If EFFSUB=0, EFFSUB indicates an effective addition which needs no negation.

Upon a possible negation of the addend, the most significant bit vector A2 is simultaneously inputted into two complementary computational devices. A2 is inputted through a third communication channel 122 to an incrementer 3 and to incrementing multiplexer or incrementing mux 5 through a fourth communication channel 103. Also, the middle bit vector A3 is inputted through a fifth communication channel 104 into a 3:2 counter 2 in conjunction with the product vectors P1 and P2.

Upon entry of all values to their proper, respective inputs, several operations occur simultaneously. The incrementer 3 increments the most significant bit vector A2 by simply adding 1, which is then inputted into mux 5 through a sixth communication channel 105. The 3:2 Counter 2 compresses the two product vectors, P1 and P2, and the middle bit vector A3 into two vectors B1 and B2. The output vectors B1 and B2 of the 3:2 Counter 2 are inputted in a compound adder 7 through a seventh communication channel 108 and an eighth communication channel 109. The compound adder 7 is well known in the art for computing the sum and sum+1 of two inputs. The resulting outputs R1 and R2 of the compound adder 7 are inputted, respectively, through a ninth communication channel 110 and a tenth communication channel 111 to a multiplexer 11, which selects between the two resulting outputs R1 and R2.

From there, the carry output CARRY from the sum-computation of the compound adder is inputted through a twelfth communication channel 112 into a selector 6 in conjunction with the output SB through a thirteenth communication channel 107 from the sticky bit computational component 4 and in conjunction with the operation index EFFSUB through a fourteenth communication channel 123. The carry generation process followed by the logic in the selector 6 and the selection of the adder results is the most time critical element in the floating-point adder.

The selector 6 generates 3 values: a carry output CARRY2, a selection bit SEL, and a signal C. The carry output CARRY2 is directed into the incrementing mux 5 through a fifteenth communication channel 115, selecting between the most significant bit vector A2 and the incremented most significant bit vector A2+1. The signal C is directed through a sixteenth communication channel 113 into the multiplexer 11 for determination of the specific yield of the sum or sum+1 depending on C's value. Typically, the value of C is dependent on the operation desired, the value of the sticky bit SB, the alignment of the addend (signaled in bit case), and carry out value CARRY, which is calculated as follows, where *! is equivalent to AND-NOT:

$$C = \text{EFFSUB} *! SB *! \text{case} * \text{CARRY}. \quad (10)$$

Finally, the selection bit SEL is directed to a final negation module 12 through a seventeenth communication channel 114.

Respectively, the incrementing mux 5 and the summation module 11 each generate a sum, SUMI and SUMM respectively. Once each of the respective sums, SUMI and SUMM, has been generated, each is directed toward a negation module. SUMI is inputted into first negation module 13 through an eighteenth communication channel 116, where the negation is based on the operation index EFFSUB. SUMM is inputted into a second negation module 12 through a nineteenth communication channel 117, where the negation is based on the input of the selection bit SEL.

Once the negation of each of the respective sums is complete, the outputs of the negation modules are inputted into a final mux 14. The first negation module 13 utilizes a twentieth communication channel 119 to output a signal to the final mux 14. The second negation module 12 utilizes a twenty-first communication channel 118 to output a signal to the final mux 14. Included in the final mux 14 is the first stage of the normalizer. Effectively, the output through the twentieth communication channel 119 and the twenty-first communication channel 118 are the outputs of the adders. Then, the final mux 14 with the incorporated normalizer yields the final, desired computation after shifting away the leading zeros.

Figure 2:
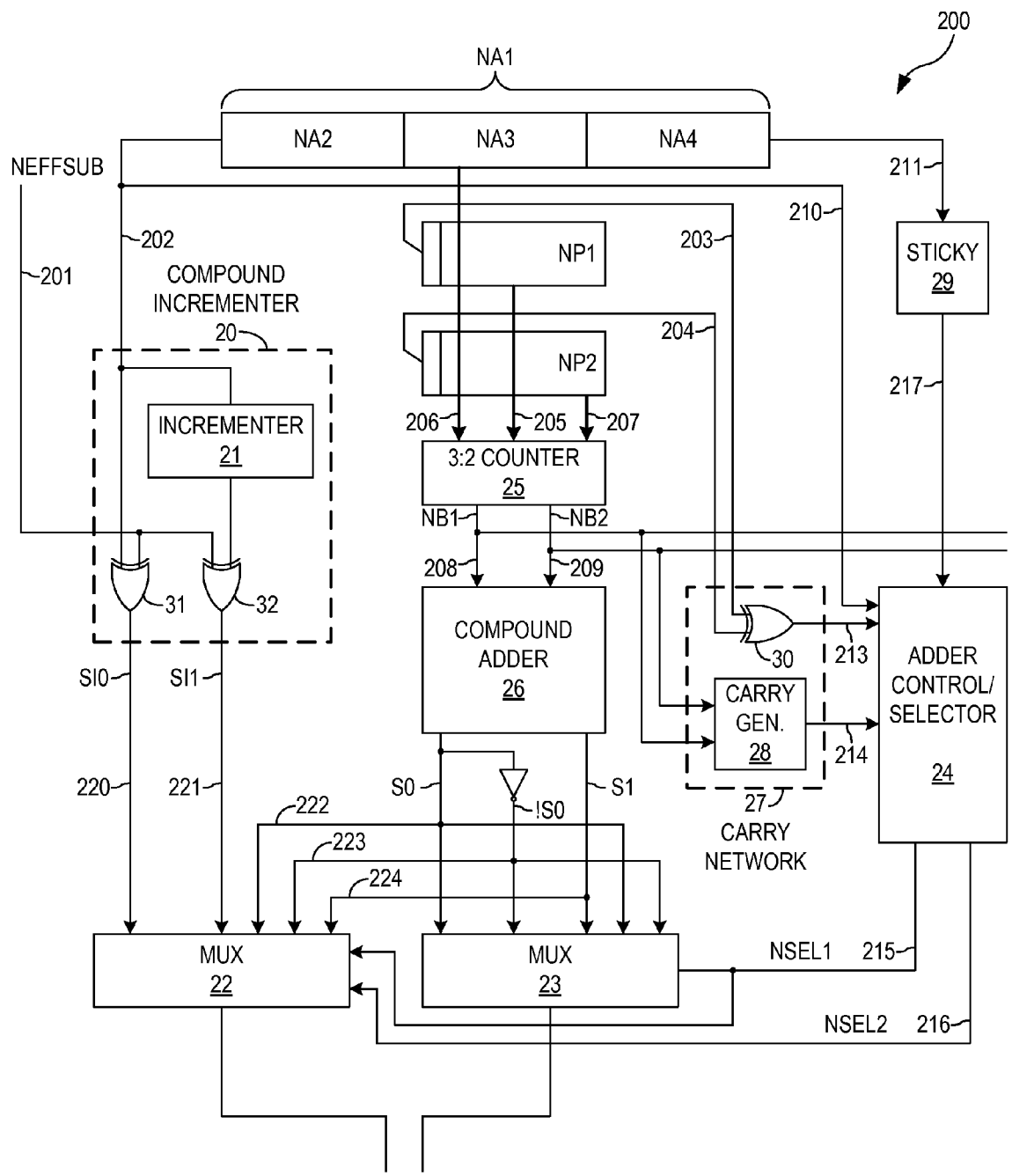
FIG. 2 is a block diagram of an embodiment of an improved High Speed Adder.

Referring to FIG. 2 of the drawings, the reference numeral 200 generally designates an improved high speed floating point adder.

FIG. 2 is an illustration of an improved High Speed Adder. Again, as in the prior art, three inputs are inputted into the adder 200, which correspond as follows: NA1 is the addend, NP1 is first product vector, and NP2 is the second product vector, wherein the products NP1 and NP2 are in redundant form. The product is of a length 2n bits where n corresponds to the precision of the floating point. For example, if single precision is employed, then n=24, and if double precision is employed, then n=53.

The addend is aligned so as to properly orient the digits of the product and addend to their corresponding order of magnitude or properly orient the bits to their corresponding weights. The process of alignment, thus, converts the addend into a number that is 4n+2 bits long, where n bits are the addend and the remaining 3n+2 bits are 0. During the process of alignment, the addend is further subdivided into three constituent vectors, which correspond as follows: NA2 corresponds to most significant n bits, NA3 corresponds to the middle 2n+2 bits, and NA4 corresponds to the least significant n bits. In case of an effective subtraction, the alignment shifter already negates the addend. This negation is integrated in the last stage of the shifter (not shown).

Once alignment has occurred, the numbers are inputted into the adder 200. The least significant bit vector NA4 is inputted into the sticky bit computation component 29 through a first communication channel 211. The most significant bit vector NA2 is directed to the compound incrementer 20 through a second communication channel 202. Also, the least significant bit of the most significant bit vector NA2 is directed to the adder control 24, which performs a substantially similar function as the selector of FIG. 1, through a third communication channel 210. The middle bit vector NA3 is inputted into a 3:2 counter 25, through a fourth communication channel 206. In conjunction with the middle bit vector NA3, the product vectors NP1 and NP2 are inputted into the 3:2 counter 25 through a fifth communication channel 205 and a sixth communication channel 207, respectively.

Upon entry of all values to their proper, respective inputs, several operations occur simultaneously. The compound incrementer 20 can combine both negation elements as a possible implementation, which are represented by XOR gates 31 and 32, and an incrementer 21 to increase the speed of the incrementing process. Also, the negation of the incrementer result and the selection between the incremented and non-incremented value have been swapped to improve timing. The compound incrementer 20 also receives an operation index signal NEFFSUB through a seventh communication channel 201, where a "1" corresponds to a negation and "0" does not correspond to a negation. The two values from the compound incrementer are labeled SI0 and SI1. The 3:2 Counter 25 compresses the two product vectors NP1 and NP2 and the middle bit vector NA3 into two vectors NB1 and NB2, which are further inputted into both a compound adder 26 and Carry-Generator 28 through an eighth communication channel 208 and a ninth communication channel 209, respectively. The compound adder 26 performs substantially the same function as the compound adder 7 of FIG. 1, which computes the sum and sum+1 of the two initial floating point numbers corresponding to the product of NP1 and NP2 and the addend. The values the compound adder yields are the sum S0 and incremented sum (sum+1)S1.

Once the summing process of the compound adder 26 and the incrementing process of the compound incrementer 20 have commenced, their respective values are directed into a plurality of muxes 22 and 23. Values SI0 and SI1 are inputted into mux 11 through a tenth communication channel 220 and an eleventh communication channel 221, respectively. The values of S0, !S0, and S1 are inputted in both mux 22 and 23 through a twelfth communication channel 222, a thirteenth communication channel 223, and a fourteenth communication channel 224, respectively.

The Carry Network (Network) 27 introduces a new feature that did not exist the conventional technology illustrated in FIG. 1. The Network 27 has inputs from the 3:2 Counter 25 through the eighth communication channel 208 and the ninth communication channel 209, respectively. Also, the sign bits of NP1 and of NP2 are inputted through a fifteenth communication channel 203 and a sixteenth communication channel 204, respectively. Contained within the Network 27 are both an XOR 30, and a carry generator 28. The XOR 30 combines the most significant bits of the products NP1 and NP2.

In Adder Control/Selector 24, the XOR 30 outputs through a seventeenth communication channel 213 and combines with the carry signal computed by the Network 27 from an eighteenth communication channel 214 and the least significant bit of the most significant bit vector NA2 from the third communication channel 210. Also, a sticky bit computation is input from the sticky bit computation component 29 to the Adder Control/Selector 24 through a twenty-first communication channel 217. Hence, the Adder Control/Selector 24 yields the most significant bit of the sum, which determines the carry-out to the incrementer (not shown). Here, in the improved High Speed Adder, the carry is calculated simultaneously with the sums. Also, the carry is a time critical element of the entire process. The Network 27 combined with the Adder Control/Selector 24 precompute a plurality of sets of select signals. Then based on the carry signal from the Network 27, the proper set of select signals is selected.

Once the Adder Control/Selector 24 completes the carry and selection, the select signals NSEL2 and NSEL1 for the multiplexers 22 and 23 are communicated through a nineteenth communication channel 216 and a twentieth communication channel 215, respectively. The selection signals combine with the outputs of the compound incrementer 20 and compound adder 26 to allow in muxes 22 and 23 to perform the actual carry-around computation and selection. By merging the muxes 5, 11, and 12 as well as the first mux 14 of the first stage of the normalizer of FIG. 1 into a single mux, the delay generated by each multiplexing operations is eliminated. Hence, the operation of the adder is further improved.

It will further be understood from the foregoing description that various modifications and changes can be made in the preferred embodiment of the present invention without departing from its true spirit. This description is intended for purposes of illustration only and should not be construed in a limiting sense. The scope of this invention should be limited only by the language of the following claims.

The invention claimed is:

1. A method for computing a result of a floating-point operation, wherein an apparatus receives an aligned addend comprising a plurality of bits and a plurality of products, the method comprising:
   receiving by a compound incrementer of a floating-point unit of a computer system at least some of the plurality of bits of the aligned addend and a control signal, and producing an output of the compound incrementer dependent upon the received bits of the aligned addend and the control signal;
   receiving by a compression counter at least some of the plurality of bits of the aligned addend and the plurality of products and producing an output of the compression counter dependent upon the received bits of the aligned addend and the received products;
   receiving by a compound adder the output of the compression counter and producing an output of the compound adder dependent upon the output of the compression counter;
   receiving by a carry network sign bits of the plurality of products and the output of the compression counter and producing an output signal of the carry network and a carry signal dependent upon the received sign bits of the plurality of products and the received output of the compression counter;
   receiving by a selector at least some of the plurality of bits of the aligned addend and the output signal of the carry network and the carry signal produced by the carry network, wherein the selector produces a selection signal dependent upon the received bits of the aligned addend, the received output signal of the carry network, and the received carry signal; and receiving by a plurality of multiplexers (muxes) the output of the compound incrementer, the output of the compound adder, and the selection signal produced by the selector, and producing the result by selecting between the received output of the compound incrementer and the received output of the compound adder dependent upon the selection signal produced by the selector.

2. The method of claim 1, the method further comprising:
receiving by an incrementer at least some of the plurality of bits of the aligned addend and producing an output of the incrementer dependent upon the received bits of the aligned addend and the control signal; and
a plurality of negation elements.

3. The method of claim 2, wherein one of the plurality of negation elements receives the output of the incrementer and the control signal, and produces an output of the negation elements dependent upon the received output of the incrementer and the control signal.

4. The method of claim 2, wherein the plurality of negation elements implement exclusive-OR (XOR) logic functions.

5. The method of claim 4, wherein the compression counter is configured to operate as a 3:2 Counter.

6. The method of claim 2, wherein the plurality of negation elements comprise XOR gates.

7. The method of claim 1, wherein operation of the carry network further comprises:
receiving the sign bits of the plurality of products and producing the output signal of the carry network dependent upon the received sign bits of the plurality of products; and
receiving by a carry generator the output of the compression counter and producing the carry signal dependent upon the received output of the compression counter.

8. The method of claim 1, wherein operation of the carry network further comprises:
receiving by an XOR gate the sign bits of the plurality products and producing the output signal of the carry network dependent upon the received sign bits of the plurality of products; and
receiving by a carry generator the output of the compression counter and producing the carry signal dependent upon the received output of the compression counter.

9. The method of claim 1, wherein operation of the selector further comprises producing a plurality of selection signals dependent upon the received bits of the aligned addend, the received output signal of the carry network, and the received carry signal.

10. The method of claim 1, wherein the output of the compound adder comprises a sum signal and an incremented sum signal, and wherein one of the plurality of muxes receives the sum signal from the compound adder, the incremented sum signal from the compound adder, and an inverted version of the sum signal, and produces at least a portion of the result.

11. The method of claim 1, wherein the compression counter is configured to operate as a 3:2 Counter.

* * * * *